March 22, 1955     H. E. SCHMITT     2,704,434
HIGH PRESSURE RATIO GAS TURBINE OF THE DUAL SET TYPE
Filed March 20, 1950     3 Sheets-Sheet 1

INVENTOR.
HEINZ E. SCHMITT
BY Wade Loomis
ATTORNEY and
Charles L. Burgoyne,
AGENT March 22, 1955 H. E. SCHMITT 2,704,434
HIGH PRESSURE RATIO GAS TURBINE OF THE DUAL SET TYPE
Filed March 20, 1950 3 Sheets-Sheet 2

INVENTOR.
HEINZ E. SCHMITT
BY Wade Koontz
ATTORNEY
Charles L. Burgoyne
AGENT

March 22, 1955 H. E. SCHMITT 2,704,434
HIGH PRESSURE RATIO GAS TURBINE OF THE DUAL SET TYPE
Filed March 20, 1950 3 Sheets-Sheet 3
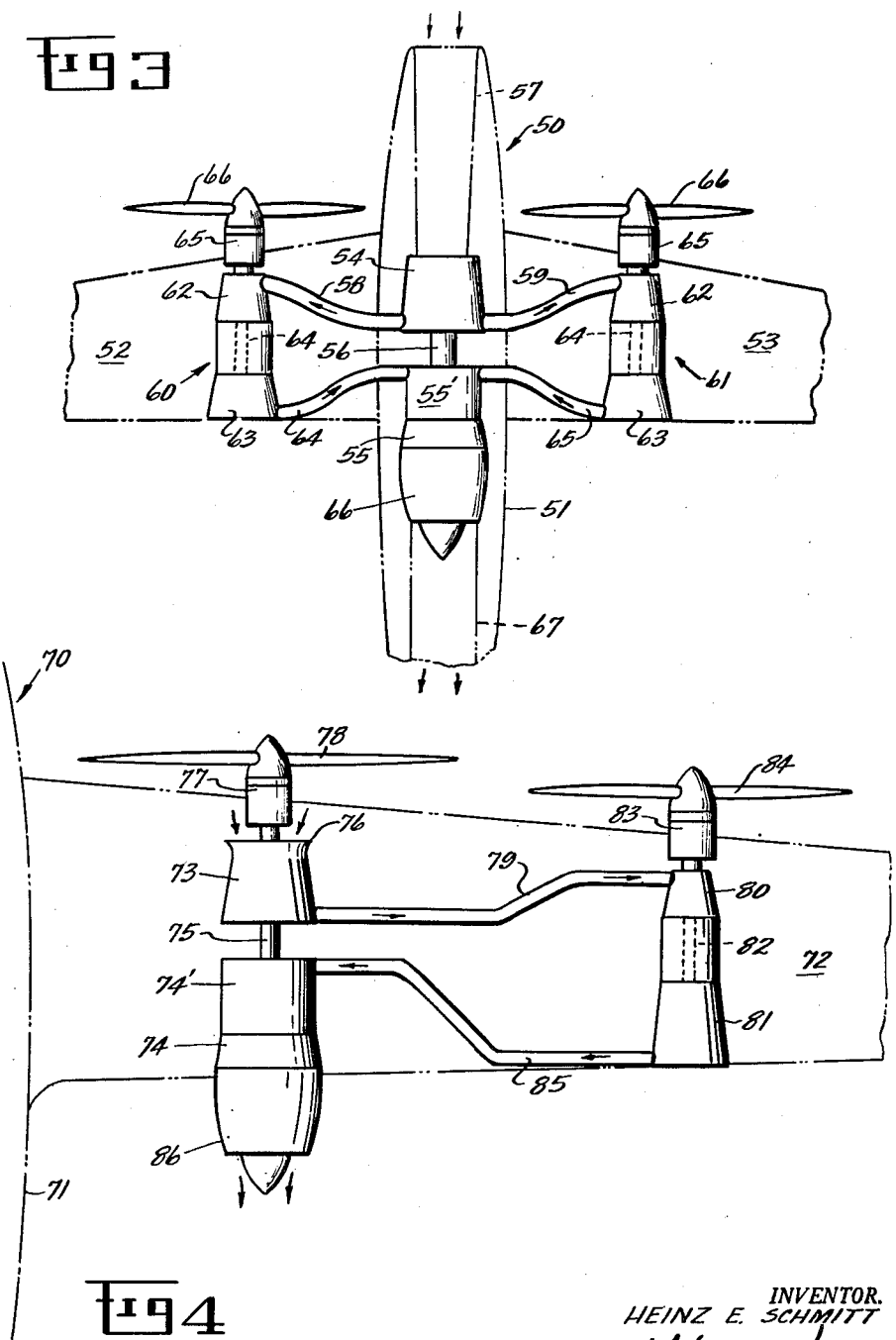
INVENTOR.
HEINZ E. SCHMITT

United States Patent Office

2,704,434
Patented Mar. 22, 1955

2,704,434

HIGH PRESSURE RATIO GAS TURBINE OF THE DUAL SET TYPE

Heinz E. Schmitt, Dayton, Ohio, assignor to the United States of America as represented by the Secretary of the Air Force Application March 20, 1950, Serial No. 150,711

1 Claim. (Cl. 60—35.6)

(Granted under Title 35, U. S. Code (1952), sec. 266)

The invention described herein may be manufactured and used by or for the United States Government for governmental purposes without payment to me of any royalty thereon.

The present invention relates to a gas turbine construction of the dual set type capable of operating at a high pressure ratio.

The primary object of the invention is to provide a gas turbine wherein the air compressor is divided into two separate sections operated by separate gas turbine sections, whereby the initial compression of the air may be accomplished by a first compressor section of larger diameter and lower rotational speed than the corresponding characteristics of the second compressor section which accomplishes final compression of the air and which has its air intake connected directly by conduit means to the air outlet of the first compressor section.

A further object of the invention is to provide a turboprop aircraft engine wherein the air compressor is divided into two separate but coaxial sections operated by separate gas turbine sections, wherein initial compression of the air is accomplished by a first compressor section having its output feeding the input of the second compressor section, wherein the high pressure air leaving the second compression section supports combustion in a first combustion chamber connected to the turbine section driving the second compressor section, wherein the exhaust gases leaving the turbine section driving the second compressor section support combustion in a second combustion chamber connected to the turbine section driving the first compressor section, wherein the exhaust gases leaving the turbine section driving the first compressor section are free to flow into the atmosphere rearwardly of the engine, and wherein the turbine section driving the second compressor section drives a propeller at the forward end of the engine.

Another object of the invention is to provide a propulsion system for aircraft including a first air compressor section located on the fore-and-aft axis of the aircraft and connected by oppositely extending conduits to second air compressor sections located outboard of the fore-and-aft axis of the aircraft, further including combustion chambers and first turbine sections for driving the second air compressor sections and also propellers located outboard of the fore-and-aft axis of the aircraft, further including a second turbine section located on the fore-and-aft axis of the aircraft receiving the exhaust gas output of the first turbine sections, further including a direct drive from the second turbine section to the first compressor section, and further including a free flow exhaust conduit from the second turbine section to the free air rearwardly of the aircraft.

Another object of the invention is to generally improve the construction and operating efficiency of high pressure ratio gas turbines and adapt such turbines for aircraft installation.

The above and other objects of the invention will become apparent upon reading the following detailed description in conjunction with the drawings, in which:

Fig. 3 shows one possible arrangement of gas turbine engines in an aircraft where the engines are interconnected by gas flow conduits and operate in accordance with the principles of the present invention.

Fig. 4 shows another possible arrangement of engines in an aircraft operating in accordance with the principles of the present invention.

The design of high pressure ratio air compressors for gas turbine engines give rise to serious difficulties, particularly in axial flow compressors where the compressor rotors are all rotating together as a unit. The higher the pressure ratio, the larger are the changes in volume and temperature in the working medium. For instance with a pressure ratio of twenty, the volume of the compressed air will finally be only one-eighth if the rotor diameter is held constant. At the same time the temperature is likely to at least double and will probably exceed twice the inlet temperature. This will mean that the blade length must be reduced to less than one-eighth in the last stage if the diameter is held constant. The clearance between blade tips and housing must remain about the same for all stages, and with an increase in the ratio between clearance and blade length with each successive stage the compressor efficiency is reduced progressively. Due to temperature rise the Mach number decreases, that is the pressure ratio for each successive stage decreases. This in turn necessitates an increase in the number of stages in the compressor. The effects of temperature rise may be counteracted by successively increasing the diameter to obtain a constant Mach number through the compressor. However with a pressure ratio of 20 an increase in diameter of about one and one-half from the first to the last stage would be necessary, which further complicates matters and makes for even shorter blades in the high pressure stages.

The ideal approach to the high compression ratio compressor would be an arrangement whereby each compressor rotor wheel would be operated at a different angular velocity but this would hardly be a practical solution. However some of the advantage to be so gained might be realized by dividing the compressor into two separate compressor units or sections, each driven by its own turbine to eliminate the use of gearing to obtain favorable speed differences. This also makes possible the adjustment of the speed of each compressor unit to obtain the best performance under changing conditions and requirements.

Figure 1:
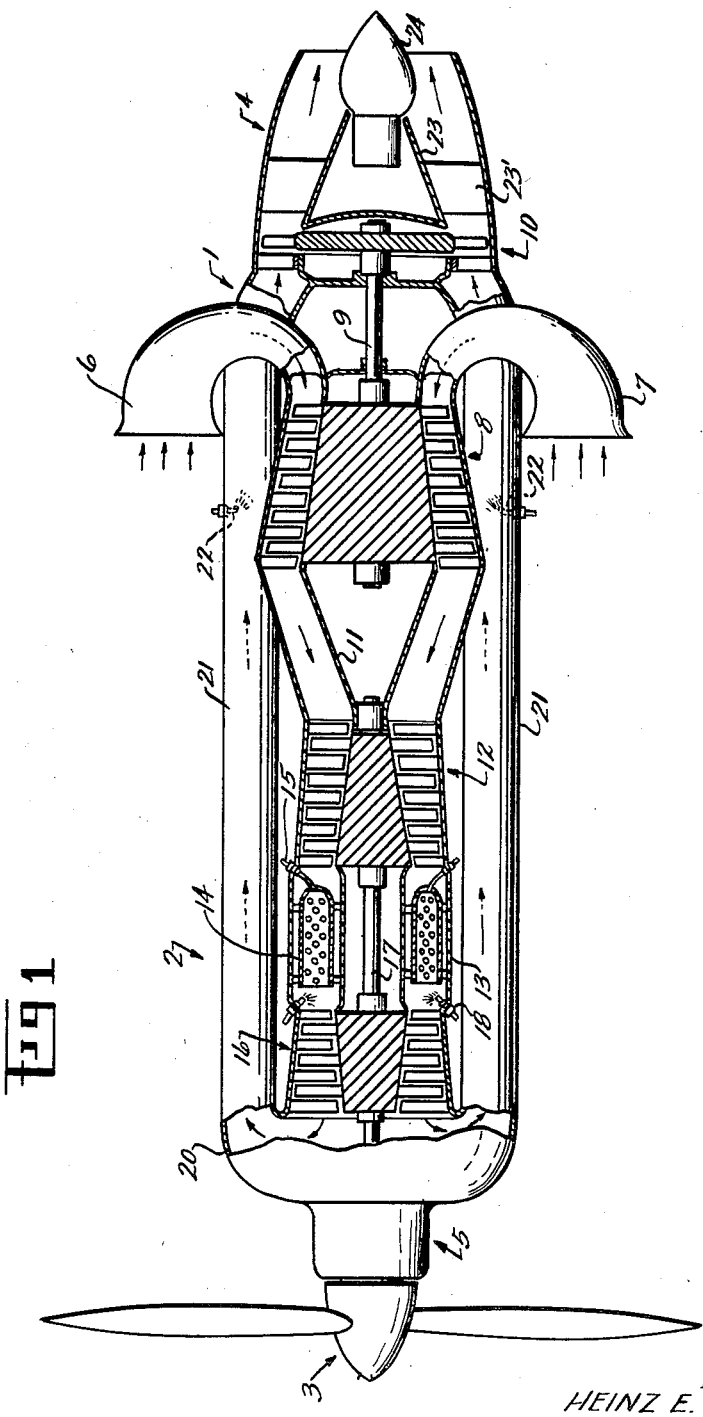
Fig. 1 shows in longitudinal cross section a dual set gas turbine engine wherein one engine set drives a propeller and wherein the two engine sets are coaxially arranged.

*Dual set engine of Fig. 1*

The above stated principle of construction using a split compressor and two separate turbines might be realized in numerous specific engine arrangements but for purposes of illustration one preferred embodiment of the invention is shown in Fig. 1 of the drawings. The engine illustrated comprises a rearward or turbojet set 1 and a forward or turboprop set 2. Thus when mounted on aircraft and extending in a fore-and-aft direction the tractor propeller 3 will be at the forward end of the aircraft structure and the exhaust nozzle 4 will open rearwardly. The engine may be housed in the aircraft fuselage, in the aircraft wing or may be mounted within an outboard engine nacelle or pod. The propeller 3 is connected to the engine set 2 by means of a reduction gear unit 5, since the engine speed will be too high for efficient propeller operation.

The engine components will be described in sequential order starting with the fresh inlet scoops 6 and 7 which collect and convey ram compressed air to the first air compressor section 8. This compressor is driven through a shaft 9 extending rearwardly to connect with a gas turbine 10. The initially compressed air passes through an annular passage 11 to enter a second compressor section 12 including a number of stages. Both compressor sections are illustrated as being built on the axial flow principle but it is always possible to use two radial flow compressors in series or one axial flow compressor feeding a radial flow compressor. Other variations are possible including multi-stage radial flow compressor sections. The air in its finally compressed condition is fed into a multiplicity of combustion chambers 13 having conventional flame holders 14 therein. Fuel nozzles 15 inject liquid fuel into the combustion chambers for combustion thereof and the consequent increase in volume and temperature of gases passing into the first turbine section 16, preferably comprising several stages in order to make full use of the highly compressed air entering the combustion chambers 13. The turbine section 16 is connected to the compressor section 12 by means of a central drive shaft 17 and also by the same shaft is connected to the propeller gear unit 5. The combustion chambers 13 may also be equipped with additional fuel nozzles 18 near the outlet ends thereof to produce a reheat combustion after the gases have passed through the turbine section 16. This feature of the engine, which is optional, is similar to the afterburner system disclosed in my copending application Serial No. 2,794 filed on January 16, 1948, now Patent No. 2,520,967.

The turbine exhaust flows into an annular chamber 20 just rearwardly of the reduction gear unit 5. From this chamber the exhaust gases, including a considerable proportion of heated air, flow rearwardly by way of a plurality of conduits 21 providing or containing combustion chambers toward the rearward end portion for reheating the flowing gases. The final combustion process operates on liquid fuel sprayed into the combustion chambers by fuel nozzles 22. The reheat process releases considerable heat and causes another expansion of the gases just as they are reaching the second or final gas turbine 10, which drives the first compressor unit 8. The exhaust gases from the turbine 10 flow into the free atmosphere by way of the exhaust nozzle 4. The central part of the nozzle 4 is filled by an exhaust cone 23 which may have an open rear end portion with an adjustable bullet 24 mounted therein for varying to some extent the cross sectional area of the exhaust opening. The exhaust cone is preferably supported by two or more struts 23' of very thin cross section.

The engine as described above will not only deliver power to rotate the propeller 3 but also acts as a turbojet engine because the exhaust from turbine 10 is free to flow into the atmosphere rearwardly of the aircraft. The engine set including the turbine 16 provides a turboprop engine section, while the engine set including the turbine 10 provides a turbojet engine section. Because of the high overall compression ratio the second set including compressor 12 and turbine 16 will be of much smaller diameter than the first set and will also operate at faster shaft speed.

Figure 2:
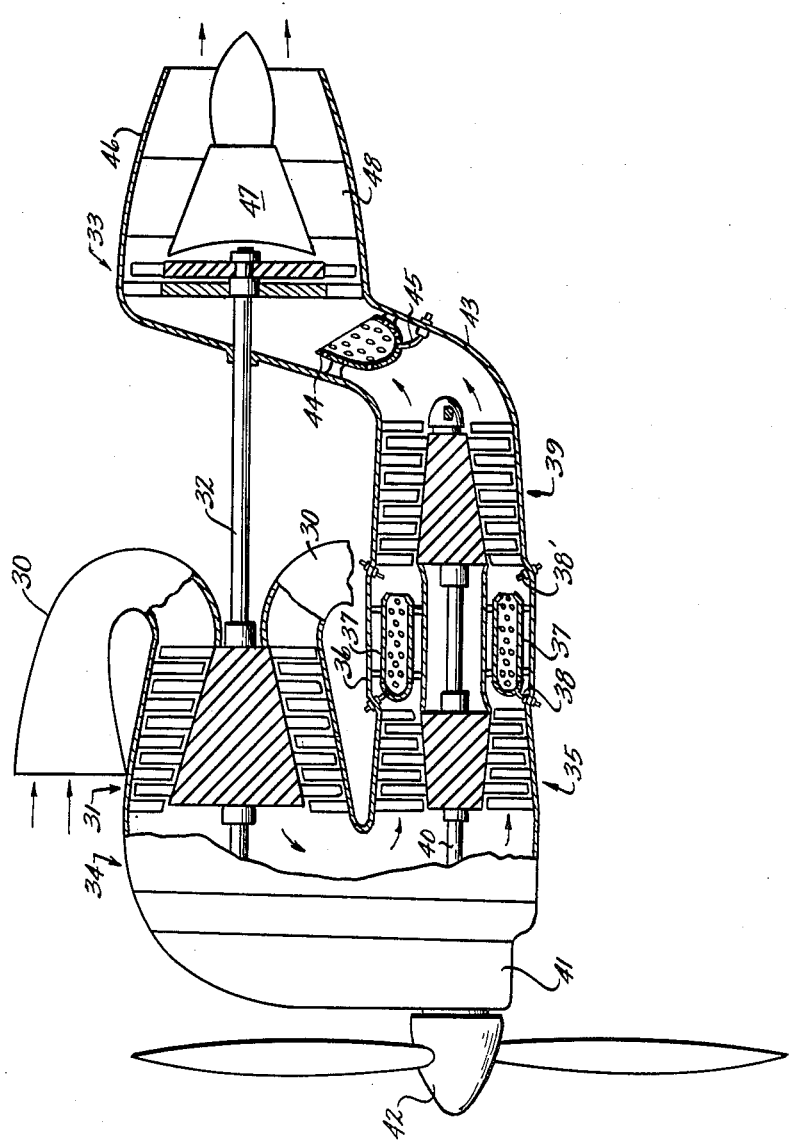
Fig. 2 shows in longitudinal cross section a dual set gas turbine engine wherein one engine set drives a propeller and wherein the two engine sets have their axes offset or spaced apart with respect to each other.

*Duel set engine of Fig. 2*

A second embodiment of the duel set principle is shown in Fig. 2 of the drawings. Here the air inlet conduits 30 opening toward the forward end of the aircraft conduct ram compressed air into a first air compressor section 31. The compressor 31 is driven through a central drive shaft 32 extending to a single stage gas turbine 33. Air leaving the first compressor 31 flows across a hollow forward section or chamber 34 to the forward end of the second air compressor section 35 of smaller diameter and higher speed than the first section 31. The air is further compressed in the axial flow compressor 35 and then issues in a fully compressed condition into a group of conventional combustion chambers 36. Each chamber is equipped with a perforated flame holder 37 coaxially mounted therein and having fuel nozzles 38 discharging atomized liquid fuel into the flame holders for combustion and consequent temperature increase of the flowing air and gases. Additional fuel injection nozzles 38' may be provided at the inlet end of the first gas turbine 39 for the purpose of obtaining a reheat combustion starting just before or just after the flowing gases leave the first turbine 39. The turbine acts as a flame arrester to delay ignition of the added fuel until the mixture has passed almost through the turbine. Vaporization of this extra fuel will tend to cool the first few stages of turbine 39, and after combustion starts the reheat action will build up the kinetic energy of the flowing gases in preparation for the second turbine cycle. The first turbine section 39 drives the second compressor 35 by means of the central shaft 40. This drive shaft extends forwardly to further connect with a gear reduction unit 41 through which power is applied to the tractor propeller 42. It should be noted that the second compressor 35 and first turbine 39 are of relatively small diameter compared to the first compressor 31 and the second turbine 33, and for this reason these smaller units do not take up much space in the complete power plant.

The products of combustion and heated air flow from the turbine 39 into a combustion chamber 43 extending to the inlet of the second gas turbine 33. Enclosed in the chamber 43 is a flame holder 44 of perforated sheet metal, which acts to prevent blow out of flames generated at the fuel nozzle 45 extending into the flame holder. The gases flowing to the turbine 33 are now very substantially reheated and capable of driving the turbine before passing into the free atmosphere by way of the exhaust nozzle 46. An exhaust cone 47 fills the central section of the exhaust nozzle and is supported therewithin by thin struts 48 attached to the side walls of the nozzle structure.

*Engine arrangement of Fig. 3*

The dual set principle explained above with respect to the engines of Figs. 1 and 2 may be applied to aircraft in various ways depending on the type, size and desired speed of the aircraft. One possible arrangement is shown in Fig. 3 and the units making up this engine or propulsion system are similar to those illustrated in Fig. 2. The principal difference is the addition in Fig. 3 of a second high pressure engine set driving a second propeller, thus providing a propeller outboard on each wing of a monoplane structure 50.

The aircraft 50 of Fig. 3 includes a central fuselage section 51 having right hand and left hand wings 52 and 53 attached thereto. Situated within the fuselage 51 is a first compressor 54 and low pressure turbine 55 connected by a central drive shaft 56. Ram air enters the compressor 54 by way of a tunnel like passage 57 opening to the atmosphere at the forward end of fuselage 51. Air is given its initial compression in the large diameter multi-stage compressor 54 and then flows in two streams by way of conduits 58 and 59 to the outboard engine sets 60 and 61. The forward end of these similar engine sets comprises a high pressure compressor unit 62 and a high pressure gas turbine unit 63. These units are directly connected in each engine set by a central drive shaft 64 and a forward extension of each shaft extends to a gear reduction unit 65 through which power is applied to the similar propellers 66.

The engine sets 60 and 61 include combustion chambers between the compressor 62 and the turbine 63, similar to the chambers 36 as seen in Fig. 2, and compressed air flowing thereinto from the compressor 62 supports combustion of liquid fuel sprayed into the combustion chambers. The heated air and products of combustion flow through the turbine 63 to furnish power for driving the compressor 62. The turbine exhaust passes into the conduits 64 and 65 for flow into the turbine 55 which drives the compressor 54. If a maximum efficiency is desired the gases must be reheated before passing through the final turbine 55. Therefore ahead of the turbine is a combustion unit 55' in which more fuel is burned to increase the kinetic energy of the flowing air and exhaust gases before it flows into the turbine 55. The unit 55' may include a plurality of separate combustion chambers or may comprise a single annular combustion chamber of conventional design. In any event the air and other gases flow from the conduits 64 and 65 into the combustion unit 55' before passing through the turbine 55 which drives the initial compressor 54. The exhaust gases from the turbine 55 flow into the atmosphere by way of the exhaust nozzle 66 and tail pipe 67.

The arrangement of interconnected dual engine sets as described provides a convenient and logical propulsion system for an aircraft of medium size. The use of propellers on the outboard engine sets will give high thrust on takeoff, while the central turbojet engine set will help to produce high thrust as the aircraft speed increases. Since the outboard engine sets 60 and 61 are susceptible of compact design due to the small diameter required, these units will not present large frontal areas to the slipstream.

*Engine arrangement of Fig. 4*

The dual set gas turbine principle may be applied in another embodiment for use in propelling large aircraft, such embodiment being shown diagrammatically in Fig. 4. Here the units making up the interconnected engine sets are similar to those disclosed in detail in Fig. 2, except that both engine sets in Fig. 4 are equipped with reduction gear boxes and connected propellers.

The aircraft 70 of Fig. 4 includes a central fuselage 71 and attached thereto are oppositely projecting wings, of which only the right hand wing 72 is shown in general outline but not including the tapered outer end. Carried on or below the wing 72 is a first air compressor 73 which is driven by a direct connected turbine 74 having its main shaft 75 extending forwardly to connect with the main shaft of compressor 73. At the forward end of the compressor 73 there is an air inlet 76 of annular form to permit entry of ram air into the compressor. The main shaft of the engine set extends forwardly to a reduction gear unit 77 through which a tractor propeller 78 is driven at a slower rotational speed than the turbine 74 and compressor 73.

The large diameter slower speed compressor 73 produces compressed air which is passed on through conduit 79 to a second compressor 80 farther outboard with respect to the fuselage 71. The higher speed compressor 80 of smaller diameter than the first compressor, is driven by means of a turbine 81 having its main shaft 82 extending forwardly tu the compressor and also to the reduction gear unit 83. The tractor propeller 84 is thus driven at a reduced speed from power furnished by the turbine 81. The compressed air from the first compressor 73 is further compressed by the second compressor 80 and flows to the turbine 81 by way of combustion chambers located around the shaft 82, the arrangement thereof being similar to that of the chambers 36 of Fig. 2. The heated and rapidly expanding gases leaving the combustion chambers flow to the turbine 81 and after giving up energy thereto, pass on by way of conduit 85 to a combustion unit 74'. Here more fuel is burned in the presence of the excess air in the flowing exhaust gases from turbine 81, the reheated gases now passing through the turbine 74 and on out to the free atmosphere by way of the exhaust nozzle 86.

Summary

The invention as described above in four possible physical embodiments contemplates in each instance a division of the air compressor into two separate compressor units with each unit driven by its own gas turbine unit, thus obviating the use of gears necessary if a single turbine were used to drive two separate air compressor units at different speeds. The disclosed arrangement makes it possible to adjust the speed of the separate engine sets to obtain the best performance under all conditions. No intercooler is necessary between the air compressor units.

In each of the embodiments disclosed there are two mechanically independent engine sets, a low pressure set and a high pressure set. Atmospheric air is drawn in by the low pressure air compressor and from it is delivered to the high pressure air compressor through a suitable duct or ducts. After compression is completed, the air passes a combustion chamber where a part of the oxygen is used for combustion in order to raise the temperature of the gases. Then the heated gases flow through a turbine which drives the high pressure compressor and also a propeller. After that the expanded and partly cooled gases flow through another combustion chamber where they are reheated before passing through a low pressure turbine which drives the low pressure air compressor. The remaining energy in the flowing gases is converted into thrust by use of a suitable exhaust nozzle.

The dual set principle described and illustrated may have many possible applications and adaptations in aircraft propulsion. For instance the arrangement of Fig. 4 will be the equivalent of a four-engine power plant and will allow a favorable arrangement because the high pressure engine set farthest from the fuselage will be comparatively small in diameter and generally compact. The specific fuel consumption will be lower than in cases where two independent engines of low pressure ratio are used to drive separate propellers.

The embodiments of the invention herein shown and described are to be regarded as illustrative only and it is to be understood that the invention is susceptible of variations, modifications and changes within the scope of the appended claim.

I claim:

A dual set gas turbine power plant for aircraft comprising, a first axial-flow air compressor unit extending in a fore-and-aft direction and receiving air from the atmosphere at its rearward end, a first drive shaft included in said first air compressor unit extending rearwardly from the compressor unit, a second axial-flow air compressor unit extending in a fore-and-aft direction and receiving first stage compressed air at its forward end from the forward end of said first air compressor unit to produce second stage compressed air, a second drive shaft included in said second air compressor unit spaced from and parallel to said first drive shaft, combustion chambers including fuel injection nozzles rearwardly of said second air compressor unit and receiving second stage compressed air to produce combustion of fuel and simultaneous heating of flowing gases and air, a first gas turbine unit rearwardly of said combustion chambers and supplied with heated gas from said chambers, means providing a direct shaft connection from said first gas turbine to the rearward end of said second drive shaft, a tractor propeller rotatably mounted on said power plant at the forward end thereof, reduction gear means providing a connection from said propeller to the forward end of said second drive shaft, a final combustion chamber including a fuel injection nozzle receiving exhaust gases from said first gas turbine unit and extending rearwardly and laterally from said first gas turbine unit, a second gas turbine unit supplied with heated gas from said final combustion chamber, means providing a direct shaft connection from the rearward end of said first drive shaft to said second gas turbine unit, and an exhaust nozzle leading from the exhaust side of said second gas turbine unit into the free atmosphere rearwardly of the power plant.

References Cited in the file of this patent

UNITED STATES PATENTS

| | | |
|---|---|---|
| 2,073,191 | Belluzzo | Mar. 9, 1937 |
| 2,409,177 | Allen et al. | Oct. 15, 1946 |
| 2,464,724 | Sédille | Mar. 15, 1949 |
| 2,473,356 | Birmann | June 14, 1949 |
| 2,501,078 | Newcomb | Mar. 21, 1950 |
| 2,546,420 | Barr | Mar. 27, 1951 |